(12) United States Patent
Aeschlimann

(10) Patent No.: US 7,818,873 B2
(45) Date of Patent: Oct. 26, 2010

(54) METHOD FOR MAKING A COIL FOR A ROTATING ELECTRICAL MACHINE ROTOR

(75) Inventor: Michel Aeschlimann, Paris (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 6 days.

(21) Appl. No.: 11/666,729

(22) PCT Filed: Feb. 22, 2006

(86) PCT No.: PCT/FR2006/000394

§ 371 (c)(1),
(2), (4) Date: Aug. 23, 2007

(87) PCT Pub. No.: WO2006/090058

PCT Pub. Date: Aug. 31, 2006

(65) Prior Publication Data

US 2008/0040912 A1    Feb. 21, 2008

(30) Foreign Application Priority Data

Feb. 25, 2005    (FR) .................................. 05 01927

(51) Int. Cl.
*H01F 7/127* (2006.01)

(52) U.S. Cl. .................. 29/598; 29/605; 310/251.1; 427/434.6

(58) Field of Classification Search .................. 29/596, 29/598, 605; 310/45, 214, 215, 254, 261, 310/261.1, 254.1; 118/75; 427/434, 427/434.6
See application file for complete search history.

(56) References Cited

U.S. PATENT DOCUMENTS

| 1,606,393 | A | * | 11/1926 | Apple ................. 427/434.6 X |
| 2,252,440 | A | * | 8/1941 | Safford ..................... 310/215 |
| 3,339,162 | A | * | 8/1967 | Burnsteel et al. .......... 29/605 X |
| 5,298,827 | A | * | 3/1994 | Sugiyama ............... 310/261 X |
| 5,476,229 | A | * | 12/1995 | Ishikawa .................. 29/605 X |
| 2002/0011757 | A1 | | 1/2002 | Tanaka et al. |

FOREIGN PATENT DOCUMENTS

| DE | 102 58 486 A1 | 7/2004 | |
| JP | 57147226 A * | 9/1982 | ............... 118/75 X |
| JP | 57-202717 | 12/1982 | |
| JP | 59-141206 | 8/1984 | |
| JP | 60-160108 | 8/1985 | |
| JP | 6-302454 | 10/1994 | |

* cited by examiner

*Primary Examiner*—A. Dexter Tugbang
(74) *Attorney, Agent, or Firm*—Berenato & White, LLC

(57) ABSTRACT

A method is provided for making an excitation coil (22) of a rotor (1) of a rotating electrical machine. The method includes a step of winding at least one electrical conductor element (30), the winding forming, in superimposed layers, a horizontal and vertical juxtaposition of turns of the electrical conductor element. The method further includes a step of impregnating to fill with a binder (34) in interstices formed between adjacent turns. The impregnating step is carried out during the step of winding of the electrical conductor element (30).

4 Claims, 2 Drawing Sheets

METHOD FOR MAKING A COIL FOR A ROTATING ELECTRICAL MACHINE ROTOR

FIELD OF THE INVENTION

Figure 1:
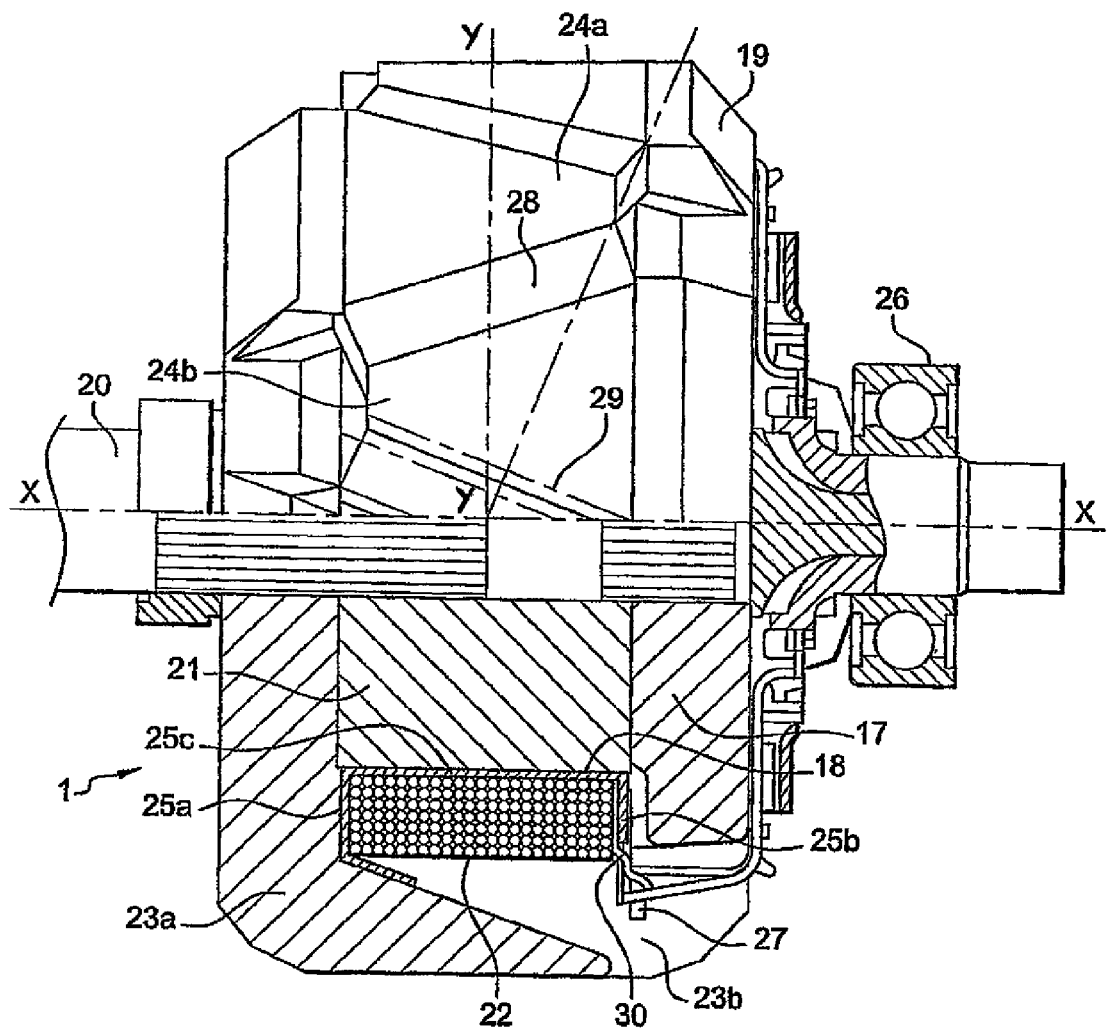

The present invention concerns a method of manufacturing an excitation coil for a rotor of a rotary electrical machine.

The invention finds applications in particular in the field of the automotive industry and, in particular, in the field of alternators and alternator starters.

BACKGROUND OF THE INVENTION

The rotary electrical machine comprises a rotor and stator on each of which an electric coil can be produced.

This rotary electrical machine may be an alternator that makes it possible to convert a rotation movement of the rotor into an electric current. The electrical machine can also be a motor that makes it possible to convert an electric current passing through the coil of the rotor into a rotation movement of the rotor. The machine may also be reversible and therefore convert mechanical energy into electrical energy and vice versa.

A rotor conventionally comprises:
- a magnetic core,
- an electrical coil that comprises a winding of at least one conductive element,
- a coil support comprising at least one annular transverse flange serving in particular for winding at least one conductive element.

The coil is produced during a step of winding the conductive element, which makes it possible to form turns regularly distributed on the magnetic coil. The coil is then in the form of a horizontal and vertical juxtaposition of turns, forming radially superimposed conductive element layers. The conductive element has, in transverse section, a generally round shape.

It can also be noted that the conductive element comprises an electrically conductive part, for example a copper wire, and an electrically insulating part, for example a layer of enamel surrounding the copper wire.

However, during the use of the rotary machine, because of the vibrations and under the effect of centrifugal force, the turns of the electrically conductive element move with respect to one another and rub either on one another or against at least one flange of the coil support. Thus the enamel protecting the copper wire may be damaged. The short-circuits resulting from this cause the rotary machine to be put out of use more or less rapidly.

In addition, there exist interstices between adjacent turns of the electrically conductive elements. These interstices are filled with air. However, during the functioning of the electrical machine, the turns heat up. The air present in the interstices being a thermal insulator, discharge of the heat to the outside of the coil is not optimised. The efficiency of the machine is therefore reduced.

To avoid these drawbacks, the document FR 1560304 discloses a method of manufacturing a coil of a rotor of a rotary electrical machine. This rotor comprises teeth belonging to magnet wheels. After having formed a coil on a magnetic core by a step of winding at least one conductive element, interstices existing between adjacent turns are filled with a binder, forming an impregnation means. This binder is a better thermal conductor than air. For this purpose, a distribution head pours the binder, when the rotor is at rest, using the space that exists between the two adjacent teeth. Then the rotor turns through an angle of 120°, and the distribution head pours the binder once again. The binder is thus poured at several points distributed over the circumference of the windings. This distribution therefore takes place in several steps.

The method disclosed in this document does not make it possible to fill in a satisfactory manner all the interstices existing between the adjacent turns of the electrically conductive element.

This is because, the rotor being mounted with its magnet wheels, the distributor cannot approach the coil in an optimum manner. The result is that the pouring of the binder cannot be precise. There are thus risks that the binder may be poured onto areas of the rotor that should not normally receive it, such as the teeth or magnet wheels.

In addition, the distributor deposits the binder at isolated points on the circumference of the coil. Thus the interstices existing between the adjacent turns of the top layers of the coil are not all filled uniformly.

In addition, in a case where the density of the turns of the electrically conductive element in the winding is great, the binder cannot reach the interstices existing between the adjacent turns of the internal layers of the coil.

Finally, the method as presented in the prior art is not optimised in terms of time since the binder is poured on the coil on several occasions.

BRIEF SUMMARY OF THE INVENTION

Thus a technical problem to be resolved by the object of the present invention is to propose a method of manufacturing an excitation coil for a rotor, and an associated rotary electrical machine, that make it possible:
- to improve the filling with a binder of the interstices existing between the adjacent turns of the top and bottom layers of the coil,
- to reduce the time taken by the manufacturing method,
- to effect the filling of the interstices, and this in a simple and economical manner.

One solution to the technical problem posed is, according to the first object of the invention, a manufacturing method characterised in that the impregnation step takes place during the step of winding the electrically conductive element.

By virtue of the invention, the interstices existing between the adjacent turns are filled with binder as the coil is produced. Thus rubbing between the turns is avoided and the discharge of the heat at the coil is improved so that the magnetic performance of the rotor is improved.

According to non-limiting preferential embodiments, the method that is the object of the invention has the additional characteristics, taken in isolation or in combination, stated below.

During the impregnation step the flow rate of the binder is controlled.

The binder is a varnish in liquid or semi-liquid form.

The binder is deposited over part of the length of the conductive element by distributing means.

The binder is deposited over the entire length of the conductive element by distributing means.

The binder becomes solid once the winding step is ended.

The binder is solidified by heating means.

According to a second object of the invention, a rotary electrical machine, in particular for a motor vehicle, provided with a rotor comprising an excitation coil, is characterised in that the coil is produced according to the method of the invention.

This was particularly advantageous in the case of a rotary electrical machine with a claw rotor carrying permanent magnets.

BRIEF DESCRIPTION OF THE SEVERAL VIEWS OF THE DRAWING(S)

Figure 2:
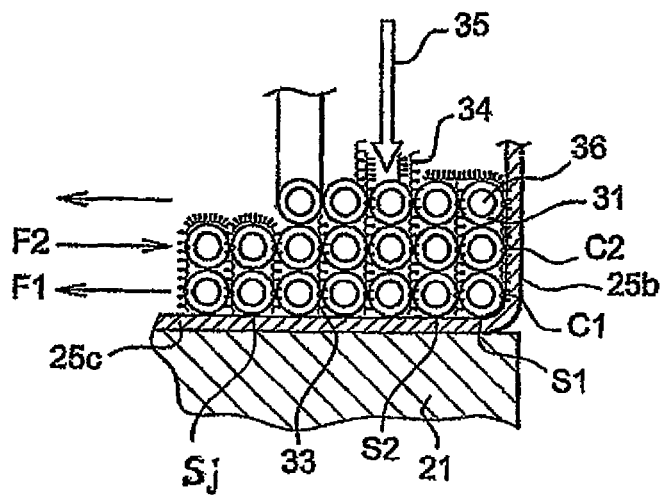
Figure 3:
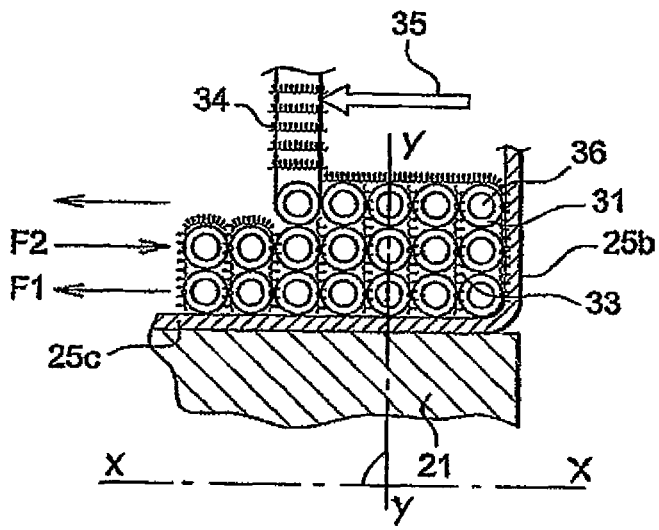
Figure 4:
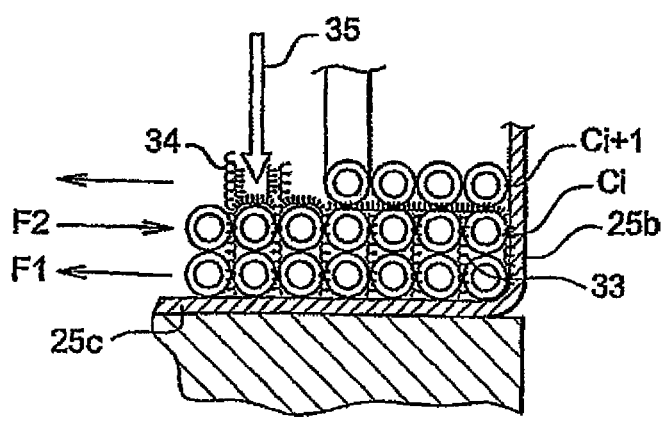

FIG. 1 is a partial view in elevation and partially in axial section of a claw rotor carrying permanent magnets, the said rotor comprising a coil manufactured according to the method of the invention, FIG. 2 is a schematic representation of the implementation of an impregnation method, according to a first non-limiting embodiment of the invention, FIG. 3 is a schematic representation of the implementation of an impregnation method, according to a second non-limiting embodiment of the invention, and FIG. 4 is a schematic representation of the implementation of an impregnation method, according to a third non-limiting embodiment of the invention,

DETAILED DESCRIPTION OF EMBODIMENTS OF THE INVENTION

In the description that follows, an example of an electrical machine has been shown. FIG. 1 shows a rotor 1 belonging to an alternator of the claw type carrying permanent magnets.

In the remainder of the description, an axial orientation X-X from front to rear will be used, which corresponds to an orientation from left to right (or horizontal), as well as a radial orientation Y-Y perpendicular to the axial orientation X-X, which corresponds to a vertical orientation, as seen in FIGS. 1 and 3.

The rotor 1 has a drive shaft 20 that enables the said rotor 1 to be mounted for rotation in a casing (not shown) of the alternator. This casing carries centrally bearings, one 26 of which is shown at FIG. 1, for the rotary mounting of the shaft.

A substantially cylindrical annular core 21 is mounted so as to be rotationally fixed on the central portion of the drive shaft 20 with rotation axis X-X.

There is also provided a coil support, made from electrically insulating plastics material, carried by the external periphery of the core.

In one embodiment, the coil support has a single annular transverse flange. A layer of electrically insulating material is placed on the external periphery of the core. The winding of the electrically conductive element therefore takes place on the said layer. It should be noted that this layer is independent of the coil support and that, through the winding step, it is interposed radially between the radially internal turns of the coil and core.

In another embodiment, the coil support can comprise a single annular rear transverse flange and also an axially oriented skirt. In this case, the axially oriented skirt extends forwards from the internal edge of the rear face of the flange.

In another embodiment, the coil support comprises an annular front transverse flange and an annular rear transverse flange and an axially oriented annular skirt connecting the two flanges.

For these last two embodiments, once the step of winding the electrically conductive element has been performed on the coil support, the latter is mounted on the magnetic core. The axially oriented skirt is thus interposed radially between the radially internal turns of the coil and the magnetic core and in addition assumes the function of the layer of electrically insulating material. It should be noted that the coil support can be mounted for example forcibly on the magnetic core.

It should also be noted that the magnetic core is a substantially cylindrical annular element independent of the two magnet wheels.

In a variant, the magnetic core can be in two parts, each of which is made in one piece with the internal face of a corresponding magnet wheel.

In the example illustrated in FIG. 1, the rotor coil of the rotary electrical machine is produced on a coil support made from plastics material that makes it possible to receive and guide the conductive element during its winding and that is fixed for example by force fitting on a magnetic core 21. The coil support has, in cross-section, a U shape. It comprises an annular front transverse flange 25a, an annular rear transverse flange 25b and an axially oriented annular skirt 25c connecting the two flanges.

The core 21 is here in a single piece. It is clamped axially between the two magnet wheels 23a, 23b.

Each of the magnet wheels 23a, 23b comprises an annular plate (17) carrying at its external periphery claws each comprising a transverse part 19 rooted on the flange extended by an axially-oriented tooth 24a, 24b. The teeth 24a, 24b are for example six in number for each of the magnet wheels 23a, 23b and angularly distributed in a regular manner around the axis X-X common to the magnet wheels 23a, 23b and to the drive shaft 20.

In this embodiment, each of the teeth 24a, 24b of a magnet wheel 23a, 23b extends axially towards the facing magnet wheel 23a, 23b, so that the teeth 24a, 24b are interleaved in each other and so as to delimit radially, with the external cylindrical surface 18 of the core 21, a space in which a coil 22 is arranged.

The electric coil 22 is produced by winding an electrically conductive element 30 in turns, so as to form layers of conductive element when moving radially, from inside to outside, in the coil.

The conductive element comprises an electrically conductive part 36, for example a copper wire surrounded by a simple electrically insulating part 31, for example a layer of enamel. The conductive element has, in transverse section, a generally round shape.

The coil 22 is produced by winding the conductive element 30 so as to form layers $C_i$ containing turns $S_j$. The index i varies from 1 to n, n being the maximum number of layers in the coil. The index j varies from 1 to m, m being the maximum number of turns per layer. The layers are thus superimposed radially. As illustrated in FIGS. 1-4, the coil 22 includes axially adjacent turns $S_j$ (with the different index j) in the same layer $C_i$, and radially adjacent turns $S_j$ (with the same index j) in the different radially superimposed layers $C_i$. The turns $S_j$ with the different index j belonging to the same layer $C_i$ are aligned axially, while the turns $S_j$ with the same index j but belonging to the different layers are aligned radially (as shown in FIGS. 1-4).

In the remainder of the description, the first layer of the conductive element, which will be designated by the reference "C1", is therefore the radially internal layer of the coil 22.

The first turn of the layer $C_i$, which will be designated by the reference S1, corresponds to the turn which will be the first wound for a given layer. According to the layers, the first turn will therefore be alternately the closest turn to the rear annular flange 25b, or the one closest to the front annular flange 25a.

The rear transverse flange 25b comprises a first means 27 for fixing the starting end of the electrically conductive element 30.

The rear transverse flange 25b also comprises a second means (not shown), substantially diametrically opposed to the first means 27, for fixing the terminal end of the electrically conductive element.

The starting end and the terminal end of the electrically conductive element are designed to be electrically connected to a source of electric current during the functioning of the rotor 1.

The winding of the conductive element 30 takes place according to the following steps. First, the electrically conductive element is fixed to the coil support by the first means 27. The winding is then carried out by combining two movements: a rotation of the core 21 around its axis X-X and an axial translation of the core with respect to the conductive element, or of the conductive element with respect to the core.

Thus the first turn S1 of the conductive element, belonging to the first layer C1 of the winding, is wound on the axially oriented skirt 25c, from the rear flange 25b.

The second turn S2 of the conductive element, belonging to the first layer C1 of the coil, is wound on the axial skirt alongside the first turn S1, for example by axial shifting of the core 21 and so on.

The winding step ends with the fixing of the terminal end of the electrically conductive element on the second fixing means.

The windings thus formed a horizontal and vertical juxtaposition of turns separated by interstices 33.

During the winding step, the impregnation step is carried out. The interstices 33 existing between the adjacent turns of an electrically conductive element 30 and the interstices 33 existing between the turns and the flanges 25a, 25b of the coil support are thus filled with a binder along with the winding.

The binder 34 is chosen so that it can fill the interstices easily. The binder is for example a varnish that can be in a liquid form or semi-liquid such as a gel.

Thus a first embodiment is described and depicted in FIG. 2.

The first turn S1 of the conductive element 30, belonging to the first layer C1, is wound as close as possible to the rear flange 25b. The following turns (S2, . . . ) are progressively shifted axially towards the front, that is to say in the direction of the arrow F1, in order to form the first layer C1 of the coil on the skirt 25c.

The first turn S1 of the conductive element 30, belonging to the second layer C2, is wound as close as possible to the front flange 25a. The following turns are progressively shifted axially towards the rear, in the direction of the rear flange, that is to say in the direction of the arrow F2, in order to form the second layer of the coil.

The winding of the conductive element 30 continues in a similar manner, the turns of each layer being shifted in alternation towards the front or towards the rear from one layer to the other.

During the formation of the various layers, a distribution means 35 pours a binder once the turn is inserted in its layer. Thus the interstices are filled as they are created.

However, according to a second embodiment depicted in FIG. 3 it is also possible to provide for the distribution means 35 to pour the binder onto the turn during the winding step but before it is inserted in its layer. Thus the interstices are filled as soon as the turn is inserted.

In addition, according to a third embodiment shown in FIG. 4 it is also possible to provide for the distribution means 35 to pour the binder onto the bottom layer Ci, during the winding of the turns of the layer that is above it Ci+1. Thus, as soon as the binder is deposited, it is instantaneously crushed by the turn, which makes it possible to fill the interstices better.

Finally, according to a fourth embodiment, not shown, it is also possible to provide for the distribution means 35 to pour the binder over the entire width of the coil support during the winding of the turns forming successive layers. The distribution means 35 will therefore be of appropriate size and/or at an appropriate distance with respect to the coil in order to pour the binder over several turns at the same time.

In the four embodiments, the distribution means 35 makes it possible, preferentially, to deposit the binder by gravity. The distribution means can for example be a nozzle connected to a binder reservoir (not shown).

The nozzle can follow the shifting of the turns while the successive layers are formed or be immobile.

The nozzle thus makes it possible to deposit the binder over the entire length of the conductive element 30.

All the interstices 33 existing between the adjacent turns and the turns and the coil support 25a, 25b, 25c are thus filled with binder. The last layer of the coil is also covered with this binder.

It is also possible to provide, for the various embodiments, means (not shown) of controlling the flow rate of binder in the nozzle during the impregnation step. These means can for example be of the squeezing device or valve type. Thus it is possible to select, for the two embodiments, the layers of the coil for which it is wished to fill the existing interstices 33 by depositing the binder over part of the length of the electrically conductive element 30. For example, it is possible to impregnate only the lower layers. These layers are the most difficult to reach, by a conventional impregnation method, because of the density of the turns. For the top layers, the interstices will subsequently be filled by another conventional method of depositing a binder. Apart from the filling of the interstices, this method will make it possible to cover the last layer with binder. The conventional method can for example be the one described in the prior art.

In addition, controlling the deposition of the binder makes it possible to avoid covering parts of the conductor that do not need to be covered. Thus, when the winding step is begun or ended by fixing the terminal end of the electrically conductive element to the first fixing means 27 or to the second fixing means, the deposition of a binder is prevented. This will make it possible to limit the consumption of this binder whilst improving the cleanliness of the winding operation.

In addition, the use of control means makes it possible to ensure that the interstice will be filled with the correct quality of binder.

This is because, if the quantity of binder poured is insufficient, the turns may rub against one another. In addition, the discharge of heat at the coil will be less efficient because of the presence of air bubbles in the interstices.

Conversely, if the quantity of binder poured is too great, there is a risk that there may be a great deal of splashing of binder when the turns are wound.

The binder, once the winding step has ended, becomes solid. The solidification may take place for example through heating means such as an oven. Thus the adjacent turns are immobilised with respect to one another and with respect to the coil support 25a, 25b, 25c. Rubbing between the turns is thus avoided and the discharge of heat at the coil is improved so that the magnetic performance of the rotor, during the functioning of the machine, is increased.

It should be noted that it is possible to use heating means in one go depending on whether only the method of the invention is used or this method is combined with a conventional impregnation method. It is also possible to use the heating means in several goes in the case where this method is combined with a conventional impregnation method.

The invention therefore makes it possible, in manufacturing an excitation coil of a rotor 1 of a rotary electrical machine, to improve the filling with a binder 34 of the interstices 33 existing between the adjacent turns of the top and bottom layers of the winding 22. The binder 34 thus penetrates to the core of the winding 22 since the impregnation step takes place during the winding step.

Moreover, the pouring of the binder 34 is controlled and more precise. Only the coil 22 receives it. This avoids splashing binder on areas of the rotor, such as the magnet wheels, that must not be covered at this time by the said binder. The use of scraping or removal operations on this area of the rotor is thus avoided. It will thus be possible for example to quickly perform an operation of welding a fan to one or both magnet wheels.

Finally, this method is more efficient in terms of saving time. This is because interstices are filled during the step of winding the electrically conductive element 30.

Once the winding step has ended, the assembly comprising the coil 22, the coil support 25a, 25b, 25c and the core 21 are placed between the two magnet wheels 23a, 23b. It should be noted that this mounting can take place before or after the use of the heating means on the coil.

In the case of claw rotors with permanent magnets, magnets 28 are placed in the teeth 24a, 24b.

The magnets 28 are housed in grooves 29 present in the lateral faces of two respective teeth 24a, 24b.

The grooving operation takes place once the teeth are placed with respect to one another, and therefore once the assembly comprising the coil 22, the coil support 25a, 25b, 25c and the core 21 is axially gripped between the two magnet wheels 23a, 23b.

It should be noted that, during this grooving, there are risks of ejection of shavings and therefore of damage to the coil 22 by these shavings.

The varnish present on the last top layer of the coil and which is in a solid form thus acts as a means of protecting the coil against the shavings.

Thus this method, by filling interstices during the step of winding a copper wire surrounded by a simple layer of enamel, affords reduced manufacturing time without additional steps, and this in a simple and economical manner. In addition, with this type of enamelled copper wire, the diameter of the conductive element is limited, and the volume of the interstices thus created and therefore the requirement for binder are reduced.

The present description is not limited to the example embodiments described above.

The invention applies to any type of rotary electrical machine such as an alternator, an electromagnetic retarder or an eddy current electromagnetic coupler and also to any type of reversible rotary electrical machine such as an alternator starter.

The invention claimed is:

1. A method of manufacturing an excitation coil of a rotor of a rotary electrical machine, comprising the steps of:
   winding at least one electrically conductive element to form, in superimposed layers, a horizontal and vertical juxtaposition of turns of the electrically conductive element with interstices formed between adjacent turns, the excitation coil including radially and axially adjacent turns such that all of the radially adjacent turns of the same vertical juxtaposition are radially aligned in the direction of a radial orientation of the excitation coil and the axially adjacent turns of the same layer being axially aligned in the direction of an axial orientation of the excitation coil perpendicular to the direction of the radial orientation; and
   subsequent to forming a first layer of the superimposed layers, impregnating and filling the interstices of the first layer with a binder in a liquid or semi-liquid form while forming turns of a second layer of the superimposed layers on the first layer.

2. The method according to claim 1, wherein the binder is a varnish in a liquid or semi-liquid form.

3. The method according to claim 1, wherein the step of impregnating and filling the interstices of the first layer comprises the step of depositing the binder with distribution means by pouring the binder onto the first layer of the turns of the electrically conductive element during the step of forming the second layer thereof.

4. A method of manufacturing an excitation coil of a rotor of a rotary electrical machine, comprising the steps of:
   winding at least one electrically conductive element to form, in superimposed layers, a horizontal and vertical juxtaposition of turns of the electrically conductive element with interstices formed between adjacent turns, the excitation coil including radially and axially adjacent turns such that all of the radially adjacent turns of the same vertical juxtaposition are radially aligned in the direction of a radial orientation and the axially adjacent turns of the same layer being axially aligned in the direction of an axial orientation perpendicular to the direction of the radial orientation; and
   subsequent to forming a first layer of the superimposed layers, impregnating and filling a plurality of the interstices of the first layer with a binder in a liquid or semi-liquid form simultaneously during the winding step.

\* \* \* \* \*